United States Patent
Belyi (10) Patent No.: US 7,593,895 B2
(45) Date of Patent: Sep. 22, 2009

(54) PROFITABILITY EVALUATION IN TRANSACTION DECISION

(75) Inventor: Boris Belyi, Houston, TX (US)

(73) Assignee: First Data Corporation, Greenwood Village, CO (US)

(*) Notice: Subject to any disclaimer, the term of this patent is extended or adjusted under 35 U.S.C. 154(b) by 0 days.

(21) Appl. No.: 11/877,061

(22) Filed: Oct. 23, 2007

(65) Prior Publication Data
US 2008/0040260 A1 Feb. 14, 2008

Related U.S. Application Data

(63) Continuation of application No. 10/175,342, filed on Jun. 18, 2002, now Pat. No. 7,386,503.

(51) Int. Cl.
*G06Q 40/00* (2006.01)
(52) U.S. Cl. .......................... 705/38; 705/35; 705/36 R
(58) Field of Classification Search .................. 705/35, 705/36 R, 38
See application file for complete search history.

(56) References Cited

U.S. PATENT DOCUMENTS

| 5,175,682 | A | 12/1992 | Higashiyama et al. |
| 5,444,616 | A | 8/1995 | Nair et al. |
| 5,679,940 | A | 10/1997 | Templeton et al. |
| 5,848,412 | A | 12/1998 | Rowland et al. |
| 5,930,777 | A | 7/1999 | Barber |
| 5,991,758 | A | 11/1999 | Ellard |
| 6,097,834 | A | 8/2000 | Krouse et al. |
| 6,117,011 | A | 9/2000 | Lvov |
| 2002/0055906 | A1 | 5/2002 | Katz et al. |
| 2002/0194096 | A1 | 12/2002 | Falcone et al. |

FOREIGN PATENT DOCUMENTS

WO 9854667 12/1998

OTHER PUBLICATIONS

Disclosure Under 37 C.F.R. 1.56 dated Sep. 3, 2009, filed for U.S. Appl. No. 11/877,061.
Rowland, Jen "Credit Scoring: Big Opportunities for Small Start-Up Businesses," Credit World, St. Louis: Sep./Oct. 1995, vol. 84, Issue 1, p. 21, 4 pages.
"Scoring Models Predict Bankruptcy in Advance," Credit Risk Management Report, Potomac: Oct. 6, 1997, vol. 7, Issue 19, p. 1.
Demery, Paul, "Trying to Out-Score the Competition," Credit Card Management, New York: Jan. 1998, vol. 10, Issue 10; p. 22, 4 pages.

*Primary Examiner*—Lalita M Hamilton
(74) *Attorney, Agent, or Firm*—Sutherland Asbill & Brennan LLP (57) ABSTRACT

A risk assessment system that performs a risk assessment of a financial transaction. The risk assessment system incorporates a profitability assessment scoring model that evaluates whether to approve or decline a financial transaction based on the potential profit or loss that can be generated by the transaction for the guarantor or merchant. The profitability scoring model uses an algorithm that is formulated to calculate a profitability score based on variables that have a direct correlation to the overall profit or loss of the transaction. The scoring model takes into consideration variables such as the per check fee charged, probability of collection, and collection fee. The risk assessment system determines whether to approve or decline a transaction based on the potential profit or loss that can be generated by the transaction.

21 Claims, 5 Drawing Sheets

Sample Profitability Scoring Variables

| VARIABLE |
| --- |
| Transaction fee from merchant |
| Probability of collection |
| Cost of collection |
| Probability of transaction return |

PROFITABILITY EVALUATION IN TRANSACTION DECISION

This application is a continuation of U.S. patent application Ser. No. 10/175,342, filed on Jun. 18, 2002, the entirety of which is incorporated herein by reference.

BACKGROUND OF THE INVENTION

1. Field of the Invention

This invention relates generally to risk assessment, and more particularly to systems and methods of evaluating risks associated with financial transactions.

2. Description of the Related Art

Most financial transactions involve a customer making a payment in exchange for goods or services from a merchant. Many times the payment is in a promissory form that instructs the customer's bank to pay the merchant. A check is one example of such a promissory form of payment. As is well known, the funds promised by the check are sometimes not paid due to reasons such as insufficient funds in the customers' checking accounts or fraud. Thus, the merchant is taking a risk whenever a check is received as a payment. Many merchants maintain local databases that include, for example, a list of check writers that have written bad checks in the past. Such databases may range from a simple list on paper for a small store owner to a computer network for a chain store. However, these databases typically include only names of check writers who have previously presented bad checks to the particular merchant and do not identify check writers who have written bad checks elsewhere. Moreover, managing such databases requires use of merchants' resources that could otherwise be used more beneficially.

In order to better manage financial transaction risks, many merchants subscribe to an agency that assesses risks associated with financial transactions based largely on the check writer's transaction history with all merchants who subscribe to the agency's service. For a given transaction, a subscribed merchant sends a transaction approval request to the agency with information such as check amount, check identifying information, and information about the check writer. The agency assesses the risk and typically generates a risk score for the transaction. The agency then either approves or declines the transaction based on the risk score. The level of subscription to such an agency can vary, from an approval service to the agency assuming the risk of the transaction by either guaranteeing the check or purchasing the check from the merchant.

In order to assess a transaction risk, the check approval agency typically calculates a risk score by inputting information about the transaction including the check, check writer, and merchant into an algorithm. The algorithm then returns the risk score that is indicative of the transaction risk. The agency then either approves or declines the transaction based on the risk score. Disadvantageously, most traditional risk assessment algorithms are designed to calculate transaction risk scores strictly based on the probability of the transaction or check being returned. Transactions with a probability of failure beyond a threshold level are automatically declined without taking into consideration factors such as the potential financial benefit generated by the transaction.

Some checks that have unsatisfactory risk scores calculated based on the traditional algorithms may however generate higher than average profit for the check approval agency, which in turn may be financially advantageous for the agency to approve the check despite of a less than satisfactory traditional risk score. For example, transactions from check writers who have a history of writing bad checks but always paid upon collection can actually be more profitable for the check approval agency because the transaction will result in not just the standard fee but also an additional surcharge for the returned check. Conventional risk assessment systems generally do not take into account of factors relating to the profitability of the transaction when evaluating transaction risks, thus often providing an incomplete and sometimes inaccurate assessment of whether to approve or decline a transaction. As a consequence, a significant portion of transactions that could potentially be beneficial to both the merchant and the check approval agency is not identified and captured.

Hence, there is a need for an improved method of assessing transaction risks that evaluates risks based on the potential financial benefit generated by the transaction. To this end, there is a need for a system and method for determining whether to approve or decline a check transaction based on the potential profit or loss generated by the transaction.

SUMMARY OF THE INVENTION

In one aspect, the preferred embodiments of the present invention provides a method of processing financial transactions. The method comprises determining with a first scoring process, a first risk score wherein the first risk score corresponds to the probability of the transaction being returned. The method further comprises providing a plurality of variables wherein at least some of the variables relate to the potential profit or loss generated by the transaction and determining with a second scoring process, a profitability assessment score based at least in part on the plurality of variables and the first risk score. Preferably, the profitability assessment score is indicative of the profit or loss generated by the transaction. The method further comprises authorizing the financial transaction based at least in part on the profitability assessment score. In one embodiment, the variables comprise the amount of transaction fee paid by the merchant, the probability of collection if the transaction returns to the merchant or transaction guarantor, and the cost of collection. The method can be implemented to determine the transactional profitability for the transaction guarantor as well as the merchant. The financial transaction can comprise promissory payments such as check or credit card transactions.

In another aspect, the preferred embodiments of the present invention provide a method for processing transaction comprising determining with a first computer processor the probability of failure for a transaction and determining with a second computer processor a transaction profitability indicator, wherein the transaction profitability indicator is based at least in part on the probability of failure of the transaction and a plurality of variables directly relating to the profitability of the transaction.

In yet another aspect, the preferred embodiments of the present invention provide an apparatus for processing financial transactions. The apparatus comprises a first module configure to determine a first risk assessment associated with a financial transaction. Preferably, the first risk assessment assesses the probability of success of the transaction. The apparatus further comprises a second module configured to determine a second risk assessment associated with the financial transaction, wherein the second risk assessment calculates the potential profit generated by the transaction and is determined based in part on the potential profit generated by the transaction and the first risk assessment.

DETAILED DESCRIPTION OF THE PREFERRED EMBODIMENT

Figure 1:
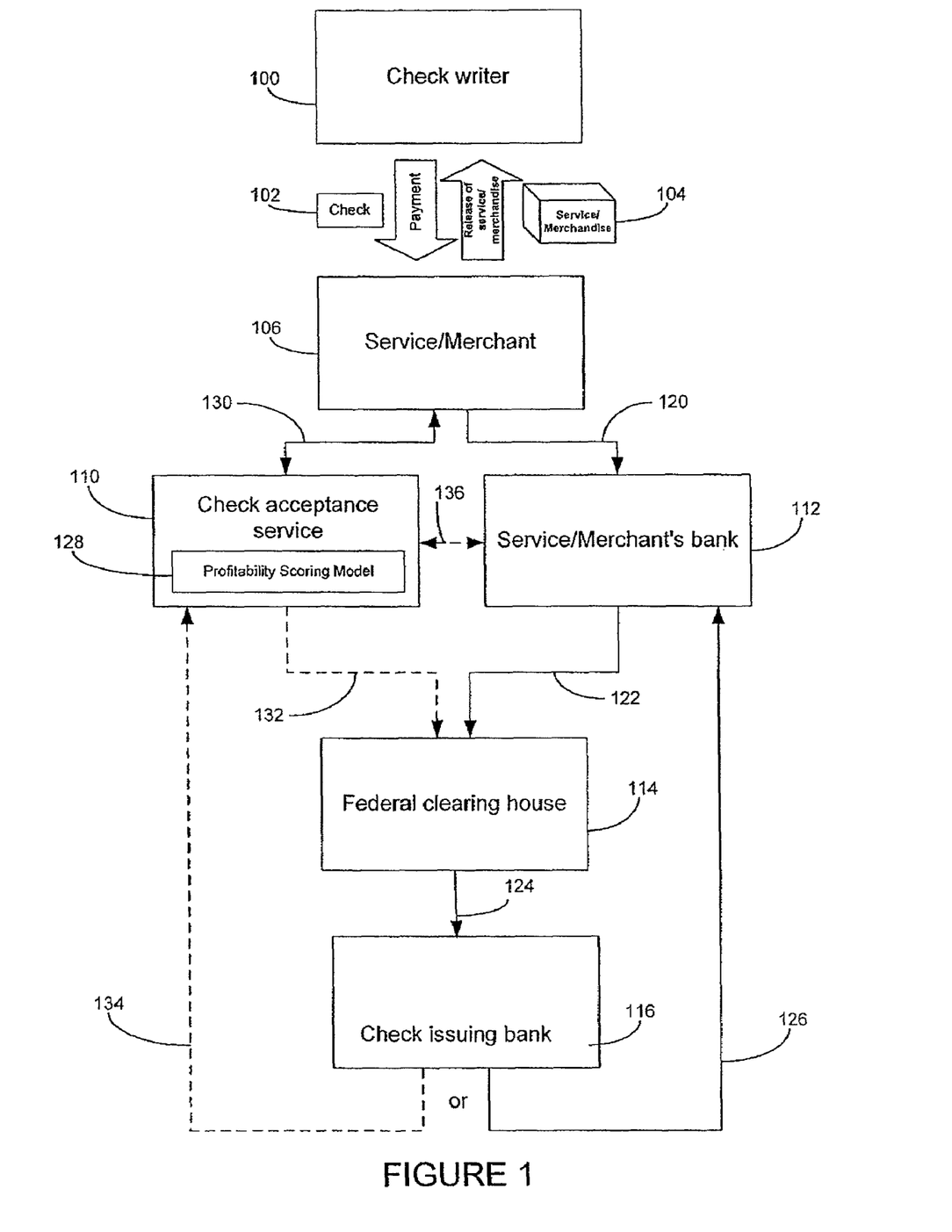
FIG. 1 illustrates a process flow of a check transaction process of one preferred embodiment.

Reference will now be made to the drawings wherein like numerals refer to like parts throughout. FIG. 1 illustrates the process flow of a financial transaction involving a promissory payment such as a check. First, a check writer 100 presents a check 102 to a service/merchant 106 (referred to as merchant hereinafter) in exchange for a service/merchandise 104 (referred to as merchandise hereinafter). The check 102 may be accepted and deposited into a merchant's bank 112 without receiving any external authorization as indicated by path 120. Such a check 102 goes through a clearing process that is well known, wherein the merchant's bank 112 sends the check 102 to a federal clearing house 114 as indicated by path 122. The federal clearing house 114, in turn, sends the check 102 to the check issuing bank 116 as indicated by path 124. If the check 102 is considered to be valid, the check "clears" and the check's amount is debited from the checking account in the check writer's bank 116 and is then transferred to the merchant's bank 112, as indicated by path 126 to complete the transaction successfully.

In many transactions, however, the check 102 does not clear for various reasons, and the merchant's bank account is not credited with the check amount. Some of those reasons include non-sufficient fund (NSF) in the checking account, stop payment request by the check writer 100, and a fraudulent check. When the check 102 does not clear, the merchant 106 is left with the responsibility of collecting the proper fund or the merchandise 104 from the check writer 100. In many instances the merchant 106 is unsuccessful in such a collection process, and the already released merchandise is generally written off as a loss. Alternatively, even when the merchant 106 is successful in ultimately collecting the check amount, the merchant's costs associated with the transaction have been significantly increased. To reduce the chance of further loss from the same "bad" check writer, the check writer's name may be added to a negative list, which is in essence a local database. However, as discussed above, the local database offers only limited protection against check writers who have previously bounced checks in the merchant's establishment. Check writers who have not bounced checks in the merchant's establishment, but have a history of bouncing checks or writing fraudulent checks elsewhere are unlikely to be detected by such a local database.

As a consequence, many merchants decide to subscribe to and rely on a check acceptance service 110 to manage risks associated with accepting checks from customers. The interaction between the merchant 106 and the check acceptance service 110 is indicated by path 130. The scope of service that the merchant 106 subscribes to varies, and three exemplary subscriptions are described below.

A first exemplary subscription comprises the check acceptance service 110 informing the merchant 106 to accept or refuse the check 102 based on the risk associated with the transaction. If the check is approved and accepted, the check 102 then goes through the clearing process via the merchant's bank 112 in a manner similar to that described above. The merchant, however, still assumes the risk associated with the transaction if the clearing process is not completed successfully.

A second exemplary subscription comprises the check acceptance service 110 guaranteeing the worthiness of the check 102 based on the risk associated with the transaction. The check 102 goes through the clearing process via the merchant's bank 112 in a manner similar to that described above. If the check 102 does not clear, however, the check acceptance service 110 pays the merchant 106 the check's amount, and assumes the responsibility of collecting from the check writer 100.

A third exemplary subscription comprises the check acceptance service 110 buying the check 102 outright from the merchant 106 based on the risk associated with the transaction. In such subscription, the transaction is complete, as far as the merchant 106 is concerned, when the merchant 106 accepts the check 102 upon approval from the check acceptance service 110. In many cases the check acceptance service 110 is electronically linked to the merchant's bank 112, as indicated by path 136, to transfer funds. The check acceptance service 110 assumes the responsibility of having the check 102 cleared. The check 102 is sent from the check acceptance service 110 to the federal clearing house 114 as indicated by path 132. The check 102 is then sent to the check issuing bank 116 as indicated by the path 124. If the check 102 is valid, fund is transferred from the check issuing bank 116 to the check acceptance service 110 as indicated by path 134, and the transaction is completed for the check acceptance service 110 as well. If the check 102 does not clear, the check acceptance service 110 assumes the responsibility of collecting from the check writer 100.

As is understood in the art, different subscriptions have different fee schedules that are generally determined by risks associated with the subscriptions. It will be appreciated that the success of the check acceptance service, including profitability, depends on accurately assessing risks associated with check related transactions. For example, if the check acceptance service gives wrong decisions to merchants that have the first exemplary subscription described above, the merchants may end up accepting high risk checks and/or refusing beneficial customers such that some dissatisfied merchants may discontinue the subscription. As for the exemplary subscriptions wherein the check acceptance service either guarantees or buys the checks, such as the second and third exemplary subscriptions described above, the risks assumed by the check acceptance service is directly related to the accuracy of risk assessments.

In one aspect, the preferred embodiments of the present invention provide a novel risk assessment system that is capable of making a more complete and accurate evaluation of whether to approve or decline a check transaction. As will be described in greater detail below, the preferred risk assessment system uses a profitability scoring model 128 to evaluate the overall profitability of a transaction and utilizes the result as a key indicator in determining whether to approve or decline a transaction. It will be appreciated that while the description herein addresses a check transaction, the inventive concepts and methods disclosed are applicable to other types of promissory payments or transactions that involve risks. These types of transaction may include, but is not limited to, credit card transaction, loan application, insurance application, and job application.

Figure 2:
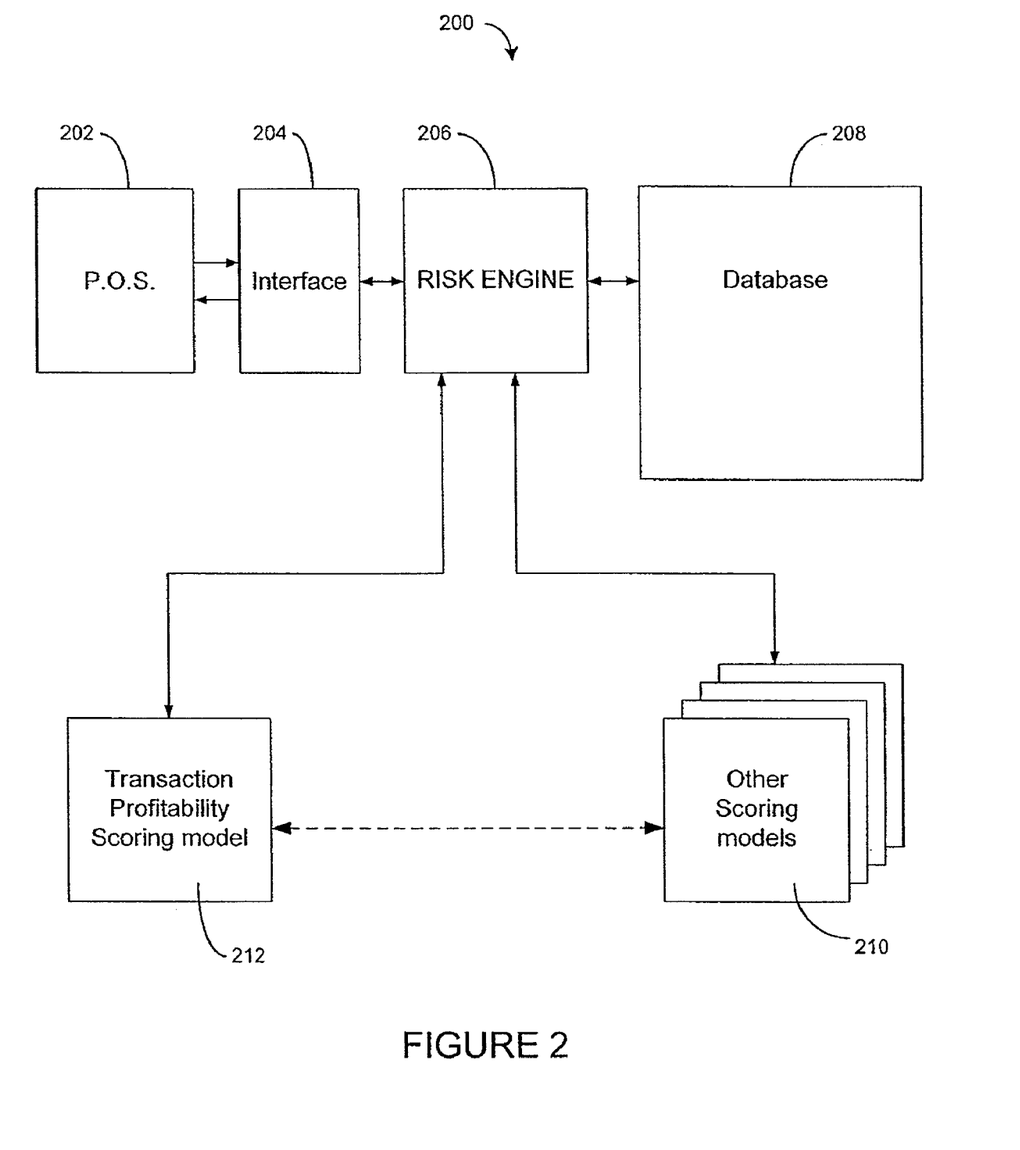
FIG. 2 is a functional block diagram of a risk assessment system of one preferred embodiment incorporating a profitability scoring model.

FIG. 2 is a block diagram illustrating a preferred risk assessment system 200 that incorporates an assessment of the overall profitability of a transaction as a basis for approving or declining the transaction. As shown in FIG. 2, the risk assessment system 200 comprises a point of sale device (P.O.S.) 202 that is typically located at the merchant's place of business. The point of sale device 202 can be an electronic cash register or any other device that is capable of transmitting transaction information to a an interface 204 such as ECLIPSE™ or ACCELERA™. The transaction information may comprise the check number, check amount, time of transaction, check writer's driver's license number, merchant ID, and merchant parameters. In a preferred embodiment, the P.O.S. 202 is capable of scanning the check's magnetic ink character recognition (MICR) pattern and electronically sending the information contained in the MICR to the interface 204. Preferably, the P.O.S. 202 is also capable of receiving communication from the interface 204 as to whether to accept or decline the check or to request additional information from the check writer. As shown in FIG. 2, the interface 204 in turn sends the transaction information submitted by the merchant through the P.O.S. 202 to a risk engine 206 that determines whether to approve or decline the transaction. The risk engine 206 can comprise a single or multiple computer processors that are configured to evaluate the overall transaction risk. In evaluating the transaction risk, the risk engine 206 can also communicate with and retrieve information from an internal database 208 that contains historical records collected on the check writer and/or the merchant.

As is generally understood, the risk engine 206 comprises a plurality of risk scoring engines or models 210, each containing scoring algorithms that can be applied to the transaction information to determine a risk score associated with the transaction. Generally, different scoring models 210 are set up to calculate transaction risk scores for different types of transaction. Based on the transaction information provided and, in some cases, historical records stored in the database 208, the risk engine 206 selects an appropriate scoring model 210 to generate a risk assessment score for the transaction and then determines whether to approve or decline the transaction based on the score.

The scoring algorithm for each of the scoring models 210 is preferably based on a different set of factors and/or different weighting of the factors. For example, risk scoring algorithms formulated for transactions that occur during holiday shopping seasons may place less weight on "frequency of check writing" but may include additional variables such as the number of bad checks the particular merchant received during past holiday seasons. Moreover, scoring models configured for transactions taking place at upscale stores may place less importance on the check amount than scoring models formulated for discount stores or pawn shops. Additionally, the risk scoring engine 206 may also comprise other functional types of models configured to determine risk override, negative history override, collectibility, which are described in greater detail in Applicant's copending application entitled SYSTEMS AND METHODS FOR SELECTIVE USE OF RISK MODELS TO PREDICT FINANCIAL RISK, U.S. Ser. No. 10/041,765, which is incorporated by reference herein in its entirety.

The various types of scoring models can be implemented as a neural network, comprising a plurality of interconnected processors that are tied together with weighted connections. The scoring models may also be implemented as a scorecard function, comprising a linear modeling algorithm that calculates a score based on an input. In one embodiment, the risk assessment system 200 comprises approximately 1,600 different scoring models. Approximately 400 are neural network types and approximately 1,200 are scoreboard types.

While the algorithm for the various scoring models may vary, the conventional scoring models generally are all configured to calculate a transaction risk score that corresponds to the probability of the check being returned or the transaction being invalid. For each of the scoring models, the variables and weighting factors are typically selected to generate a score that is indicative of the likelihood that the transaction will fail. As such, most transaction approval/decline decisions are being made from a rather limited perspective, one that does not take into account of the potential overall financial benefit generated by the transaction.

To improve the quality of the resulting decision, the risk engine 206 of the preferred embodiment incorporates a profitability scoring model 212 that is configured to evaluate the overall profitability of the transaction as opposed to just the probability of the transaction being unsuccessful. The profitability scoring model 212 assesses the transaction based on the expected profit or loss of the transaction, preferably taking into account of variables not considered by most conventional scoring models. In one embodiment, the profitability scoring model 212 calculates a profitability assessment score for the transaction from the check acceptance agency's perspective, such that the score is indicative of the potential financial gain or exposure for the agency. In other embodiments, the profitability scoring model 212 can be structured to calculate a profitability assessment score from the merchant's perspective. As shown in FIG. 2, the profitability scoring model 212 can also interact with other scoring models 210 and incorporate results generated by other scoring models 210 as variables in calculating the profitability assessment score. However, it can be appreciated that the profitability scoring model can also make its profitability assessment based primarily on transaction information and historical records without incorporating results generated by other scoring models.

Figure 3:
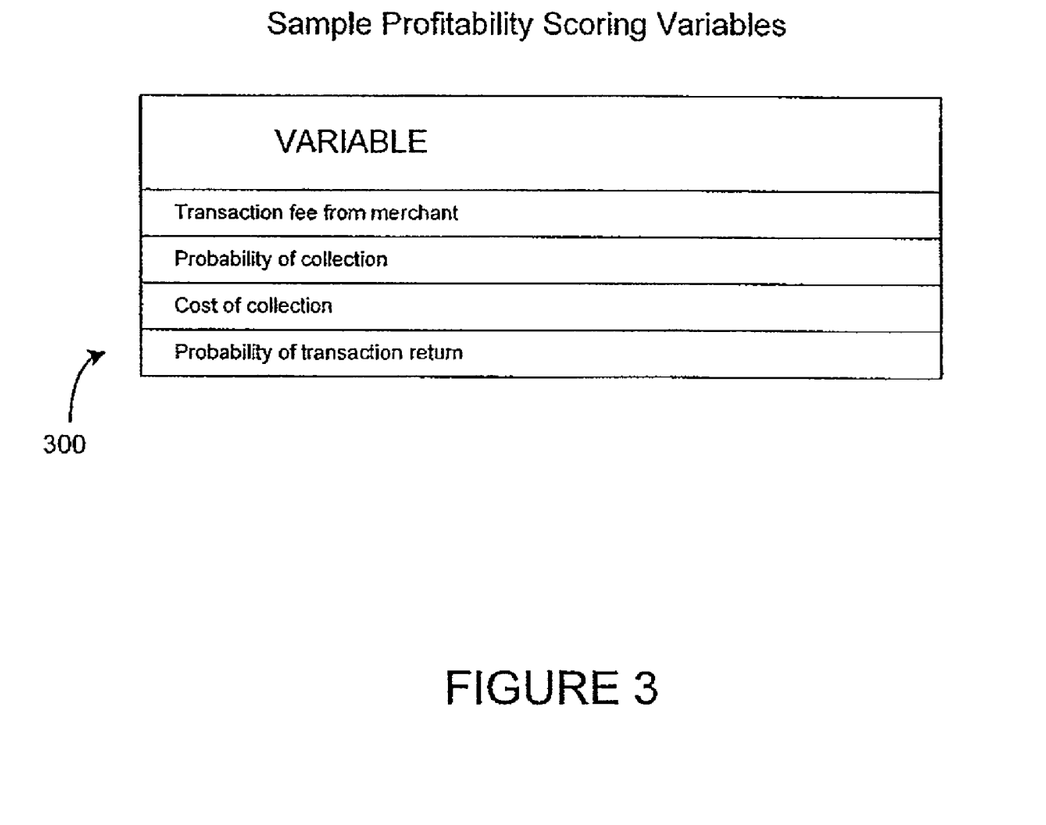
FIG. 3 is a table of exemplary profitability risk scoring model variables incorporated in the profitability scoring model of FIG. 2.

FIG. 3 is a chart 300 illustrating some of the variables used in an exemplary transaction profitability scoring model for the risk assessment system of one preferred embodiment. As shown in FIG. 3, the transaction profitability scoring model evaluates a transaction based on variables such as fees paid by the merchant, probability of collection, cost of collection, probability of transaction return. These factors directly impact the potential profit or loss that can result from the transaction although many of these factors may not be relevant in assessing the transaction's probability of success. For example, transactions for which the merchant is paying a higher than average per check fee may provide additional incentive for the check acceptance service to approve the transaction because it can potentially generate a higher profit for the check acceptance service. Moreover, transactions with a high probability of failure but also a high probability of collection can actually be more profitable for the check approval agency or merchant because of the additional check return fee that are usually levied against the check bouncer. However, assessing transactions from a profit/loss perspective is generally not considered in the framework of most standard scoring models as the standard scoring models are typically formulated to assess a transaction based on its probability of success. Thus, the standard scoring models often fail to identify transactions whose potential profitability outweighs a higher than average risk of failing. Advantageously, the profitability scoring model of the preferred embodiments takes into account variables that directly correlate to the expected profit or loss of the transaction and provides a score that is indicative of the financial benefit of the entire transaction as oppose to merely one aspect of the transaction.

In one embodiment, the variables may include resulting scores from other scoring models, such as scoring models that are formulated to calculate the transaction's probability of success or the probability of collection if the transaction is returned to the merchant or transaction approval service. In another embodiment, each variable is given a weighting factor and the overall profitability score is calculated based on this weighting factor. For example, the probability of collection may warrant a large weighting factor because the ability to collect on a bad check can significantly affect whether the transaction results in a profit or loss for the check acceptance service and merchant. The overall profitability score provides an indication the profit potential of the transaction from the perspective of the check authorization service. However, in other embodiments, the variables can be selected to determine the expected profit or loss from the perspective of the merchant. For example, the scoring model may include variables such as the specific product purchased in the transaction as it may be financially feasible for a merchant to accept a check for a purchase of a slow moving product even though the check has a higher than average probability of being returned. Moreover, it may also be profitable for a merchant to accept a high risk check if the probability of collection is relatively high. Hence, risk assessment systems that utilize the profitability scoring model are capable of identifying potentially profitable transactions that may otherwise be overlooked when using the traditional scoring models.

Figure 4:
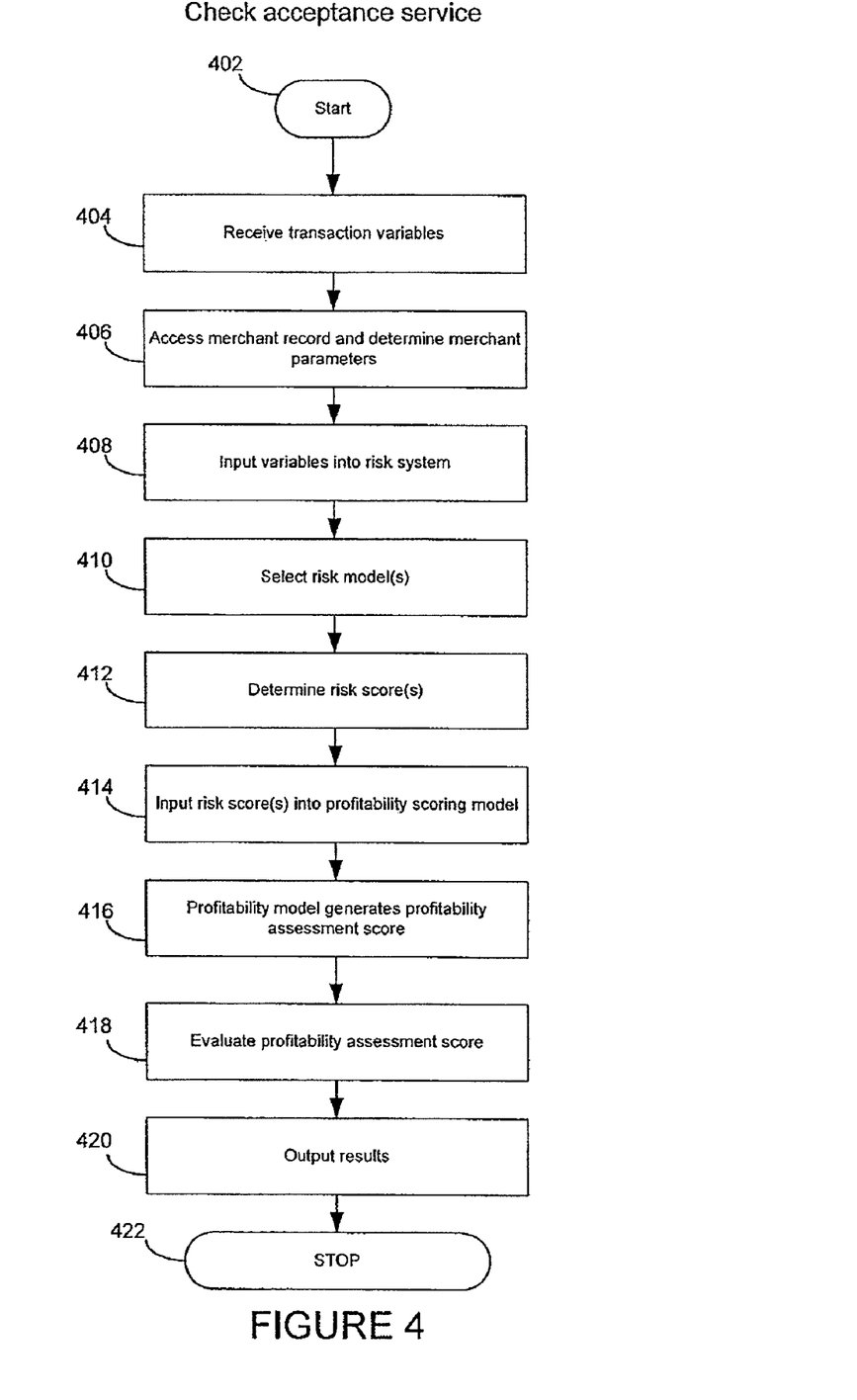
FIG. 4 is an exemplary flowchart of a check transaction utilizing the risk assessment system of one preferred embodiment.

FIG. 4 illustrates a flow chart that describes the function of a transaction approval service implementing the risk assessment system as described herein above. A transaction approval process begins at a start state 402. In state 404, the transaction approval service receives transaction information from the merchant. The transaction approval service, in state 406, then accesses merchant record and determines merchant parameters that affect the manner in which the risk assessment is to be performed. The transaction approval service inputs the variable into the risk assessment system in state 408. In state 410 that follows, the risk system determines which risk scoring model to apply based on the input variables. In a preferred embodiment, the risk system can apply more than one risk scoring model to the input variables. In state 412, the selected risk scoring model(s) generate(s) a score based on the input variables. The risk system, in state 414, inputs the score(s) generated by the risk scoring model(s) into the profitability scoring model. It can be appreciated that in some embodiments the risk system selects only the profitability scoring model and does not apply any other scoring models. In state 416, the profitability scoring model generates a profitability assessment score based on the input variables and, in some embodiments, scores from other risk engines. The risk system, in state 418, evaluates the profitability assessment score. The results are output to the merchant in state 420, typically in the form of whether to approve or decline a transaction. The transaction risk assessment is completed by a stop state 422.

Figure 5:
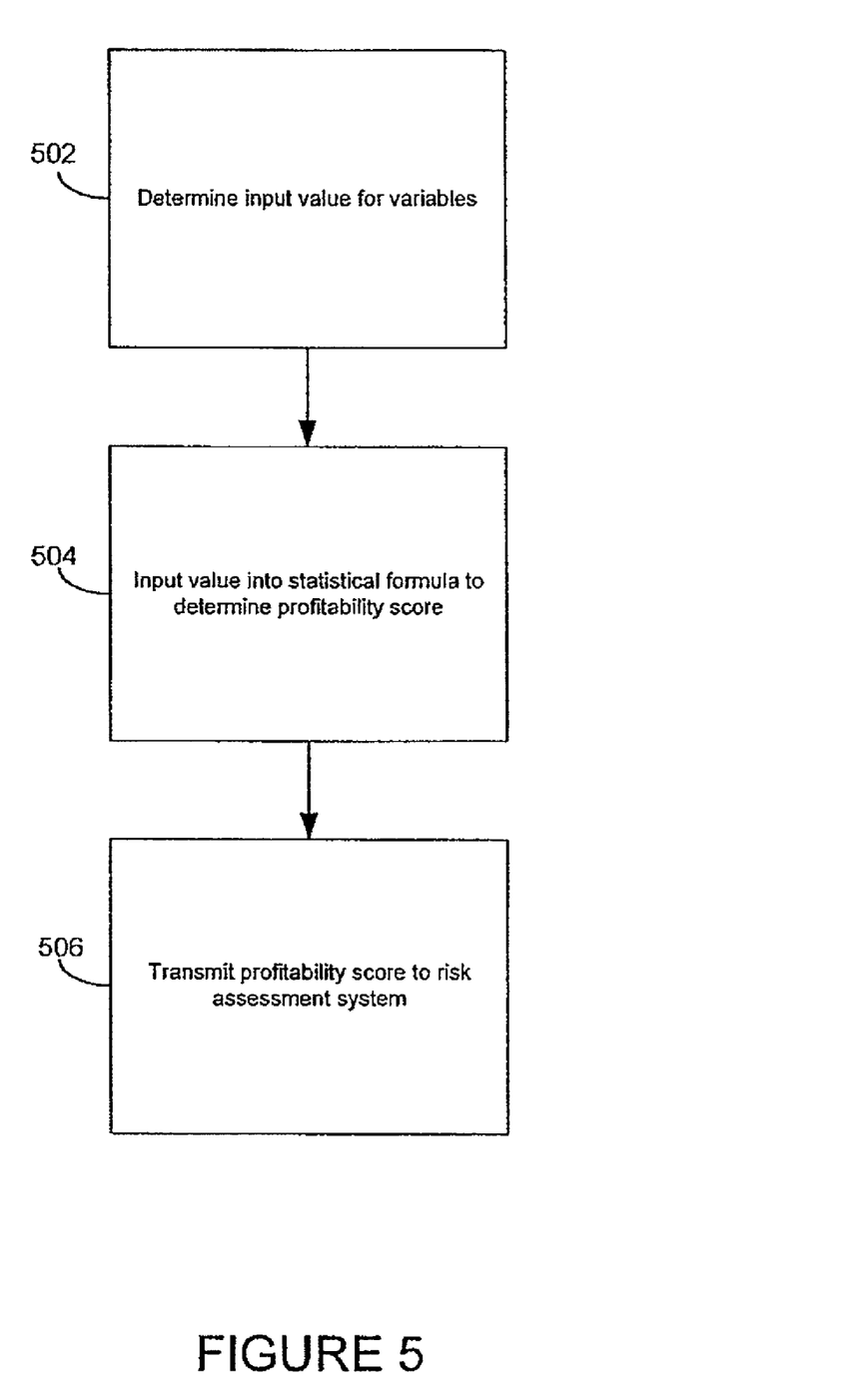
FIG. 5 illustrates a process flow of the manner in which the profitability assessment score is determined.

FIG. 5 provides an illustrative example of the manner in which an exemplary profitability scoring model determines a profitability assessment score. As FIG. 5 shows, in step 502, the profitability scoring model first determines an input value for each of the following variables: probability of return ($P_R$), probability to collect check amount ($P_C$), probability to collect service fee if check amount is collected ($P_{svc}$), probability to collect other fees if check amount is collected ($P_{other}$), effective rate charged to merchant (R), collection expenses ($C_{Ex}$), service fee (SvcFee), other fees (Other), and check amount (Amt).

In one embodiment, the probability of return ($P_R$) is determined by calculating the ratio of number of returned checks to the total number of checks written by the check writer in the past year. For example, if the check writer has written a total of 200 checks in the past year and 20 of the checks returned, the probability of return is 20/200 or 0.1. Similarly, the probability to collect check amount ($P_C$) can be determined by calculating the ratio of number of collected checks to the total number of returned checks written by the check writer in the past year. For example, if the check writer has written a total of 20 bad checks in the past year and the merchant or check approval service is able to successfully collect 15 out of the 20 checks, the probability to collect the check amount is 15/20 or 0.75. The probability to collect service fee and other fees if check amount is collected can also be determined by calculating the ratio of the number of returned checks for which such fees are successfully collected to the total number of collected returned checks. Moreover, the profitability scoring model can use a variety of other algorithms or methods to determine the values of $P_C$, $P_R$, $P_{svc}$ and $P_{other}$. For example, the profitability scoring model can incorporate results from other scoring models designed to calculate the probability of return, probability of collection, and the like. Alternatively, the above probabilities can be estimated using statistical models such as neural nets and scorecards that are known in the art. Preferably, these scorecards provide scores of similar transactions having substantially the same parameters.

In the exemplary profitability scoring model, the variable "effective rate charged to the merchant" is a percent multiplier applied to the check amount that the merchant pays the check approval service as transaction fee. The effective rate may vary depending on the merchant and the business sector. For example, the effective rate for pawn shops may be higher than grocery stores because transactions taking place in pawn shops generally have a higher risk of failure than transactions in grocery stores. The effective rate can also be set based on the average number of transactions processed per year by the merchant. Rates for merchants that process a large number of transactions through the check approval service may be lower than merchants that use the check approval service on a limited basis. In one embodiment, the effective rate ranges from 1%-25% of the check amount. Alternatively, the effective rate can be substituted by a fixed amount that is charged to the merchant per transaction regardless of the check amount.

After the profitability scoring model determines an input value for each variable, the values are then inputted into a statistical formula to arrive at a profitability assessment score in step 504. Following is an exemplary formula for calculating the profitability assessment score although it can be appreciated that the formula and variables used can vary for different profitability assessment models without departing from the spirit of the invention.

$$\text{Profitability Score} = (Amt \times R) - P_R(Amt - P_C(Amt + (P_{Svc} \times SvcFee) + (P_{other} \times Other)) + C_{Ex})$$

As shown in the exemplary formula above, the profitability score corresponds to the difference between the minimum revenue generated by the transaction and the potential loss incurred if the transaction fails. The minimum revenue generated by the transaction can be determined by multiplying the effective rate and the check amount. The potential loss can be calculated by multiplying the probability of return by the expense that will be incurred by the check approval service if the transaction is returned. The expense comprises the check amount and collection cost offset by potentially collectable check amount and service fees. As the exemplary formula illustrates, the potentially collectable check amount and service fees can be determined by multiplying the probability of collecting the check or fees by the respective amount of the check or fees.

It can be appreciated that the above-described formula is only one example of a variety of possible formulas that can be used to calculate the profitability assessment score. Different formulas for calculating the score can be deviced for different profit structures. For example, if the profit structure is set up in a manner such that only a predetermined number of attempts to collect the money would be made and if the money is not collected, the check would be sent back to the merchant. In that case, the formula for calculating the profitability assessment score will be modified accordingly.

Once the profitability score is determined, the risk scoring model transmits the score to the risk assessment system in step 506. The risk assessment system determines whether to approve or decline the transaction based on the score. In one embodiment, the risk system compares the profitability score to a predetermined cutoff score. The risk system approves the transaction if the profitability score is higher than the cutoff score and declines the transaction if the score is lower. In one embodiment, the cutoff score is determined based on historical data collected on the merchant. Based on historical data, profitability scores can be pre-calculated for every transaction in the database for each merchant and then correlated to the actual profit or loss generated by the transactions. For example, for a particular merchant, if more than 90% of the transactions with a profitability score greater than 20 have generated profit for the check approval service, then the cut off score is set at 20 for that merchant. In another embodiment, the cutoff score can be adjusted regularly to adapt to changes in the merchant's business or clientele. Advantageously, the exemplary profitability scoring model is capable of identifying high risk transactions that could potentially be profitable for the check approval service but would be declined by traditional risk assessment systems.

Hence, it will be appreciated that the risk assessment system and process of the preferred embodiments provide a more complete and accurate assessment of risks associated with financial transactions. The risk assessment model evaluates a transaction from a perspective that takes into account not just the transaction's probability of success but also the expected profit or loss that can be generated by the transaction. This framework provides a more complete and bottom-line oriented evaluation of a transaction. As a consequence, merchants and transaction approval services are better able to identify and capture financially beneficial transactions that would otherwise be overlooked or declined.

Although the foregoing description of the preferred embodiments of the present invention has shown, described and pointed out the fundamental novel features of the invention, it will be understood that various omissions, substitutions, and changes in the form of the detail of the method and apparatus as illustrated as well as the uses thereof, may be made by those skilled in the art, without departing from the spirit of the invention. Consequently, the scope of the present invention should not be limited to the foregoing discussions, but should be defined by the appended claims.

What is claimed is:

1. A computer-implemented method for processing financial promissory transactions, the method comprising:

receiving, by a processor, at least one transaction parameter associated with a merchant;

determining, by the processor, a profitability assessment score, wherein determining the profitability assessment score comprises at least using a formula comprising Profitability Score=$(Amt \times R) - P_R(Amt - P_c(Amt + (P_{Svc} \times SvcFee) + (P_{Other} \times Other)) + C_{Ex})$, wherein Amt=transaction amount, R=effective rate charged to the merchant, $P_R$=probability of return, $P_{Svc}$=probability to collect a service fee if transaction amount is collected, SvcFee=service fee, $P_{Other}$=probability to collect other fees if transaction amount is collected, Other=other fees, $C_{Ex}$=collection expenses; and authorizing, by the processor, the financial promissory transaction based at least in part on the profitability assessment score and the at least one transaction parameter.

2. The method of claim 1, wherein determining the profitability assessment score further comprises a collection fee for the financial promissory transaction.

3. The method of claim 1, wherein determining the profitability assessment score further comprises a probability of collection if the financial promissory transaction is returned.

4. The method of claim 1, wherein determining the profitability assessment score further comprises determining a potential profit or loss associated with the financial promissory transaction for the merchant.

5. The method of claim 1, wherein determining the profitability assessment score further comprises determining at least one risk assessment score from at least one other risk scoring process.

6. The method of claim 1, wherein the financial promissory transaction is a check transaction.

7. The method of claim 1, wherein the financial promissory transaction is a credit card transaction.

8. A computer-implemented method for processing promissory transactions, the method comprising:

receiving, by a processor, at least one transaction parameter associated with a merchant;

determining, by the processor, a transaction profitability indicator for a promissory transaction, wherein the transaction profitability indicator is determined based on at least the following variables: amount of the promissory transaction, effective rate charged to a merchant associated with the promissory transaction, probability of failure of the promissory transaction, probability to collect a service fee if the amount is collected, amount of service fee, probability to collect other fees if the amount of the promissory transaction is collected, amount of other fees, and collection expenses; and authorizing, by the processor, the promissory transaction based at least in part on the transaction profitability indicator and the at least one transaction parameter.

9. The method of claim 8, wherein the transaction profitability indicator is further determined based at least in part on the probability of collection if the promissory transaction fails.

10. The method of claim 8, wherein the promissory transaction involves merchandise or services offered by the merchant and wherein the transactional profitability indicator is further determined based at least in part on the merchant's desire to sell the merchandise or services.

11. The method of claim 8, wherein determining the transaction profitability indicator further comprises a collection fee for the promissory transaction.

12. The method of claim 8, wherein determining the transaction profitability indictor further comprises at least one risk assessment score.

13. The method of claim 8, wherein the promissory transaction is a check transaction.

14. The method of claim 8, wherein the promissory transaction is a credit card transaction.

15. An apparatus for processing promissory transactions comprising:
at least one processor programmed to determine a transaction profitability indictor for a promissory transaction using a formula comprising Profitability Score=(Amt×R)−PR(Amt−Pc(Amt+(PSvc×SvcFee)+(POther×Other))+CEx), wherein Amt=transaction amount, R=effective rate charged to the merchant, PR=probability of return, PSvc=probability to collect a service fee if transaction amount is collected, SvcFee=service fee, POther=probability to collect other fees if transaction amount is collected, Other=other fees, CEx=collection expenses.

16. The apparatus of claim 15, wherein the processor is further programmed to determine the transaction profitability indicator based at least in part on the probability of collection if the promissory transaction fails.

17. The apparatus of claim 15, wherein the processor is further programmed to determine the transaction profitability indicator based at least in part on the merchant's desire to sell the merchandise or services.

18. The apparatus of claim 15, wherein the processor is further programmed to determine the transaction profitability indicator based at least in part on a collection fee for the promissory transaction.

19. The apparatus of claim 15, wherein processor is further programmed to determine the transaction profitability indicator based at least in part on one risk assessment score.

20. The apparatus of claim 15, wherein the processor is further programmed to process the promissory transaction when the transaction is a check transaction.

21. The apparatus of claim 15, wherein the processor is further programmed to process the promissory transaction when the transaction is a credit card transaction.

* * * * *